UNITED STATES PATENT OFFICE.

OTTO K. SLATER, OF CHICAGO, ILLINOIS.

PROCESS OF MAKING FERTILIZER.

1,067,224.  Specification of Letters Patent.  Patented July 8, 1913.

No Drawing.  Application filed January 2, 1913.  Serial No. 739,807.

*To all whom it may concern:*

Be it known that I, OTTO K. SLATER, subject of the Emperor of Germany, residing at Chicago, in the county of Cook and State of Illinois, have invented certain new and useful Improvements in Processes of Making Fertilizers; and I do hereby declare the following to be a full, clear, and exact description of the invention, such as will enable others skilled in the art to which it appertains to make and use the same.

My invention relates to methods of making fertilizers out of materials in which the desired fertilizing ingredients are present in an insoluble and, therefore, commercially unavailable condition.

In the United States large quantities of slag are continually produced in the smelting of iron ores. Some of these have such a composition as to be valuable for use in the making of cements, but this is not true of the basic slags produced in working the so-called open hearth steel processes, which processes result in slags that are to a large extent wasted at present.

The object of my invention is to utilize the lime contained in such slag together with the phosphorus contained in cheaply obtainable minerals and compounds by treating them together to produce mixtures which will be sufficiently rich in lime, phosphorus and sulfate of ammonia to be valuable as fertilizers, and which will contain these fertilizing ingredients in forms in which they can easily be dissolved and assimilated in the soil.

In carrying out my invention, I begin my mixing basic open hearth slag with a phosphate or with some mineral containing phosphorus. The two initial ingredients are preferably placed in a digester or other suitable apparatus which may be closed substantially air-tight and in which steam and other vapors may be applied to the mixture without removing the same from the container. The slag to be treated in this way need not be broken or ground before being placed in the digester, but can be used in any size of lumps or pieces that will enter the vessel in which the treatment is made by the method of my invention. Having placed the phosphatic material together with the slag in the digester, I first apply a moist vapor as a disintegrating agent, preferably using steam at a pressure of from ten to one hundred pounds. The pressure may be varied according to the size of the digester and according to the mixture of materials in the same, but in any case, the disintegrating effect of the steam upon the slag will gradually cause the same to crumble to pieces and to more thoroughly intermix with the phosphatic matter. At the same time, the latter material will also be affected by the moist vapor, thereby changing the same, at least in part, from an insoluble to a soluble form. This action upon the two ingredients is continued until the steaming and agitation converts the mixture to a soft and moistened condition and one in which the slag compounds are sufficiently porous to be easily reached by a later application of any vapor to the mixture.

Having thus disintegrated the solid and bulky pieces of slag and partly softened both of the ingredients, I next pass sulfurous fumes over or through the mixture, these fumes being preferably obtained by roasting an ore containing sulfur, such as iron pyrites. The method of obtaining sulfurous fumes from such cheaply obtainable ores is generally familiar to those engaged in the smelting line and need not be described here. The resulting sulfur-bearing fumes are preferably forced through the mixture in the digester immediately after the steam has been shut off from the latter and while the mixture is in the warm and moist state. When this is done, the sulfurous fumes in passing through the innumerable interstices existing between the various parts of the mixture will contact quite generally with the surfaces of the constituents forming the moist and porous mass. In doing so, the fumes will partly combine with the moisture of the mass in forming sulfurous acid, which will be scattered widely through the mass. A part of this sulfurous acid will be oxidized by the air, which is also present, so as to form sulfuric acid, which acid will act upon the phosphoric material to change some of the latter to a more soluble form. If desired, additional steam may be fed through the mass in connection with the sulfurous fumes, or the latter may be forced through the mixture by the pressure of steam acting on the general principle of the well-known steam injector.

While the disintegrated, and more soluble mixture produced by the steps above described, may in itself be used as a fertilizer, I preferably add a further step by introducing into the digester ammonia which will combine with the sulfur ingredients of the mass to form readily soluble sulfates having high fertilizing values. This may be done by forcing ammonia or a strongly ammoniacal gas through the mass, whereupon the ammonia will eagerly combine with any of the sulfur compounds scattered through the mass, thereby forming ammonium sulfate, which in itself is a valuable fertilizer. Moreover, since the sulfur compounds will have attached themselves to the various parts of the mass all through the latter, the sulfate of ammonia produced by this last step will likewise be scattered throughout the mixture and will be intimately intermingled with calcium and phosphorous compounds in a soluble condition. Consequently, the resulting mixture may readily be marketed without any further grinding or mixing. At the same time the proportions of phosphorus, soluble calcium compounds, and ammonia compounds may be varied through a wide range by merely varying the proportions of the raw materials used as a basis for my process. For instance, I have found that I can vary the proportions of slag and phosphatic minerals to range from thirty to seventy per cent. of each; and that by thus varying the proportions of the initial ingredients, the resulting product may be made to contain from ten to twenty per cent. of soluble phosphates, from five to ten per cent. of soluble iron compounds, from forty-five to fifty per cent. of soluble calcium compounds, and from two to eight per cent. of ammonia compounds. Since this change in the proportions can be effected by simply varying the nature and proportions of the initial ingredients, it will readily be seen that the method of my invention permits the production of compound fertilizers nicely proportioned for effective use in agricultural, horticultural or floral work demanding certain proportions for best results.

I am aware that phosphatic and ammoniacal materials have heretofore been intermixed in dry form for use as fertilizers; also that such fertilizing ingredients have been extracted from the same raw materials used in my method by means of liquids, such as strong acids. The former method requires the use of ingredients which are costly in themselves and the same holds true of the use of the acids. By my method cheap raw materials may be used both for the initial mixture and for producing the sulfur fumes, while the needed ammonia may, if desired, be obtained also as a cheap and undesirable by-product from gas works and in the manufacture of various chemicals. So also, the sulfurous fumes produced in the working of various ores may be utilized by working my method close to the smelters operating upon such ores. Moreover, in using my method or process, the slag and the mineral or compound containing the phosphorus may both be used in the lump forms in which they are most cheaply available, as the first step in my process serves to crumble and disintegrate them so that no previous grinding or pulverizing of the ingredients is required. While this disintegration is taking place, the contents of the digester may be stirred mechanically, if desired. However, I have found in practice that the agitation due to the action of the steam upon the raw materials will disturb these sufficiently to cause a considerable intermingling while the insoluble phosphates and iron compounds are being converted, at least in part, into soluble forms. Then when the softened mass is fumigated with the sulfurous fumes, the sulfur constituents of the latter will unite with portions of the softened mass scattered all through the same. Consequently, the ammonium sulfate or other nitrogenous salts formed by subjecting the fumigated mixture to the action of an ammoniacal aeriform fluid will also be thoroughly intermingled with the other constituents of the mass, leaving the latter impregnated with soluble ammonia salts.

Having thus described my process, I wish it understood that the same may be varied considerably both in the materials and proportions used for it and in other details without departing from the spirit of my invention. For example, instead of depending on ordinary suction to draw the sulfur fumes or the ammoniacal gas through the moistened and softened mixture in the digester, such fumes or gases may be forced through the mixture by means of blowers. So also, instead of supplying the sulfurous and ammoniacal elastic fluids for a predetermined length of time, each of these may be used as long as the mass continues to absorb sulfur or ammonia respectively, from the gas thus used.

What I claim as new and desire to cover by Letters Patent, is:

1. The method of making fertilizer from slag, which comprises mixing slag with phosphorus material, disintegrating the mixture by the action of steam and treating the disintegrated mixture with sulfurous fumes.

2. The method of making fertilizer from slag, which comprises mixing slag with phosphorus material, disintegrating the mixture by the action of steam and treating the disintegrated mixture while still moist with sulfurous fumes.

3. The method of making fertilizer from slag, which comprises mixing slag with phosphatic material, disintegrating the mixture by the action of steam and treating the disintegrated mixture with sulfurous fumes.

4. The method of making fertilizer from slag, which consists in mixing slag with phosphorus material, disintegrating the mixture by the action of steam, treating the disintegrated mixture with sulfurous fumes, and subsequently treating the product with ammoniacal vapors.

5. The method of making fertilizer from a mixture of slag and phosphatic material, which consists in successively subjecting the mixture to steam, sulfurous fumes and ammoniacal gas.

6. The method of making fertilizer from a mixture of slag and phosphorus material, which consists in softening the mixture and disintegrating the slag by subjecting it to steam under pressure; fumigating the resulting mass with sulfur fumes while still moist, and treating the fumigated mass with an ammoniacal gas.

7. The method of impregnating a moistened and softened mixture of slag and phosphorus material with soluble nitrogenous salts, which comprises successively subjecting the said mixture to sulfurous and ammoniacal aeriform fluids.

In testimony whereof I have signed my name in presence of two subscribing witnesses.

OTTO K. SLATER.

Witnesses:
  M. M. BOYLE,
  ALBERT SCHEIBLE.